United States Patent [19]
Haraikawa

[11] 3,804,212
[45] Apr. 16, 1974

[54] VEHICLE WHEEL BRAKE UNIT
[75] Inventor: Tetsuo Haraikawa, Kawasaki, Japan
[73] Assignee: Tokico Limited, Kawasaki-shi Kanagawa-ken, Japan
[22] Filed: July 31, 1972
[21] Appl. No.: 276,441

[52] U.S. Cl. ............... 188/72.4, 92/110, 188/345, 188/370
[51] Int. Cl. .................... F16d 55/18, F16d 55/224
[58] Field of Search ....... 188/345, 306 P, 370, 72.4; 60/54.6 M; 92/110, 111

[56] References Cited
UNITED STATES PATENTS
2,577,462  12/1951  Hackney .............................. 92/111
3,312,313  4/1967  Moyer .............................. 188/345 X
3,502,181  3/1970  Lepelletier .......................... 188/345
3,517,782  6/1970  Hayes .............................. 92/110 X Primary Examiner—George E. A. Halvosa
Attorney, Agent, or Firm—Holman & Stern

[57] ABSTRACT

A hydraulic wheel brake unit for receiving, in a dual fashion, pressure liquid from a hydraulic pressure-generating and supply source of a power driven wheeled vehicle such as an automobile for pressurizing friction means against a brake disc rotatable in unison with a wheel of the vehicle for effecting a vehicle braking operation.

3 Claims, 5 Drawing Figures

PATENTED APR 16 1974 3,804,212
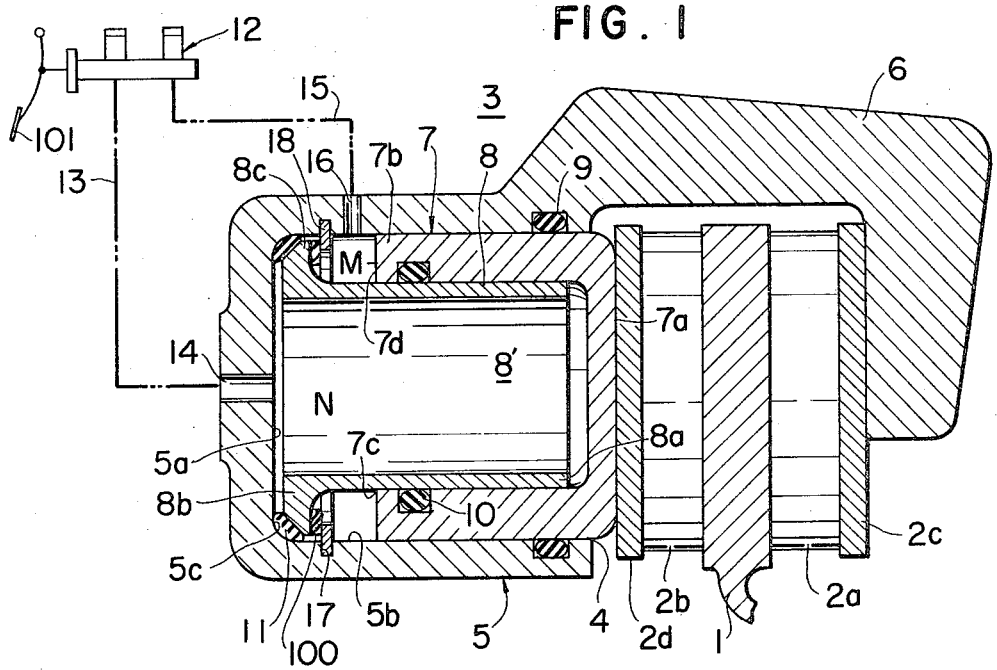
FIG. 1
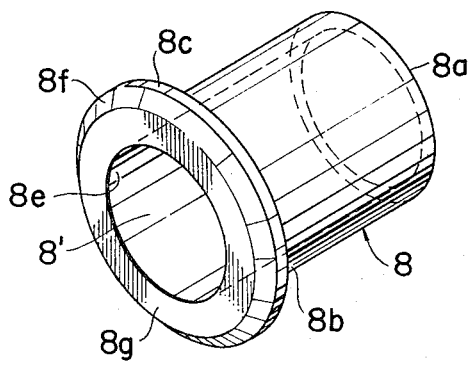
FIG. 2
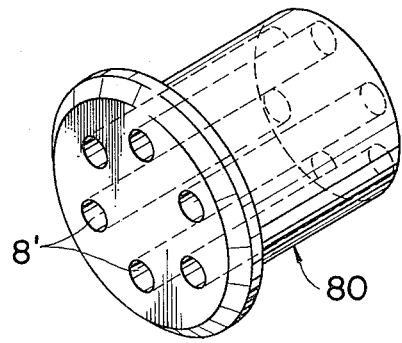
FIG. 3
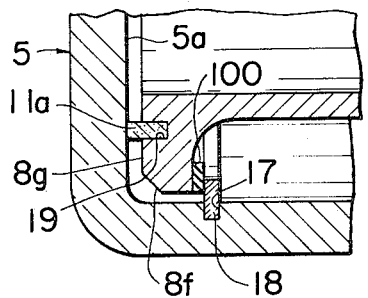
FIG. 4
FIG. 5

VEHICLE WHEEL BRAKE UNIT

BACKGROUND OF THE INVENTION

This invention relates generally to improvements in and relating to hydraulic brake devices for powered and wheeled vehicles. It relates more specifically to duplicate brake devices of the above kind.

PRIOR ART

More recently, the duplicate hydraulic brake system has been broadly used for improving the safety of such braking system wherein the independent component systems are operable independently so as to provide a possibility such as of assuring safety in an emergency of operational failure of one of the dual system components. More specifically, the dual braking system is so designed and arranged that the two operationally independent system components extend from a hydraulic pressure-generating source, preferably a master cylinder, to brake cylinders attributed to the vehicle wheels for an independent supply of hydraulic braking pressure thereto. A salient feature of the provision of this kind of dual hydraulic brake system is such that the operation of the vehicle brakes can be safely brought about when necessary, and not only with the effective conditions of the two independently operable system components, but also, in the case of accidental and operational failure of one of these components, thus assuring an absolute safety in the braking operation for the vehicle.

Various and numerous dual hydraulic brake systems have hitherto been proposed, of which, however, it is believed that such type as having a brake disc rotatable in unison with the vehicle wheel, and a brake cylinder positioned at one side of said wheel so as to actuate its piston means for exerting a braking pressure upon the rotating brake disc by supply of the hydraulic brake pressure to said cylinder in two independent ways through the dual hydraulic system components constituting in combination the dual hydraulic system, is the best among others.

For this purpose, however, the cylinder must be formed with two independent hydraulic chambers adapted for the reception of independent hydraulic pressure, thus representing a highly complicated design and machining.

OBJECTS AND SUMMARY OF THE INVENTION

The main object of the present invention is to provide the dual hydraulic system of the above kind which comprises a least possible number of high precision components, an easy assembling and disassembling possibility and an easy manufacturing facility on a mass production basis.

A further object of the present invention is to provide the dual hydraulic brake system of the above kind which has a least possible number of constituents of simple design and which is economical from a manufacturing standpoint.

The above and further objects, features and advantages of the invention will become more apparent when read in conjunction with the following detailed description of the invention and in reference to the accompanying drawings illustrative of a preferred embodiments of the invention in which drawings:

FIG. 1 is an axial section of a dual type brake piston-cylinder unit attributed to one of the wheels of a vehicle, wherein, however, a dual hydraulic brake piping system with a master cylinder for the unit is shown only schematically and in a highly simplified form, FIG. 2 is a perspective view of a hollow cylindrical member contained movably in the hydraulic cylinder of said unit shown in FIG. 1, FIG. 3 is a similar view to FIG. 2, illustrating a modification of the hollow cylindrical member shown therein, FIGS. 4 and 5 are partial sectional views of two respective modifications of sealing means provided between the hollow cylindrical member and the hydraulic cylinder, from that shown in FIG. 1.

DETAILED DESCRIPTION OF THE EMBODIMENTS

Referring now to FIG. 1 of the drawings, the arrangement is an application of the inventive idea to a single cylinder type disc brake unit. In this embodiment, a brake disc, only partially shown is denoted 1 and, which is designed and arranged to rotate in unison with one of the vehicle wheels, not shown, on account of the popularity thereof.

2a and 2b denote a pair of conventional brake pads or friction elements which are shown as being kept in pressure contact with the now rotating brake disc 1 at both sides thereof. This position is naturally that appearing in the brake application period.

Numeral 3 represents generally a hydraulically operated piston-cylinder unit attributed to the vehicle wheel under consideration. When the unit 3 is converted in its operational position from the brake application to the off-service position, as will be described hereinafter in detail, the friction elements 2a and 2b are kept in their separated position from contact with the disc 1 upon performing axially receding movement in opposite directions to each other. Thus, these elements 2a and 2b perform no rotational movement. 2c and 2d are back-up plates which are fixedly attached respectively to the friction elements 2a and 2b, by means of conventional fixing means such as screws, rivets, an adhesive agent and/or the like, although not shown due to its very popular use. Although not shown, there are provided stationary guides for allowing the axial movement of the friction pad units 2a;2c and 2b;2d.

The hydraulic piston-cylinder unit 3 is provided at one side of the brake disc 1 and at a predetermined distance therefrom and comprises a hydraulic cylinder 5 opened at its inner end at 4 and closed at its outer end, and an arm 6 is integral with the cylinder 5. This arm 6 is substantially L-shaped in section and straddles the peripheral edge of disc 1 and is kept in contact with the rear surface of back-up plate 2c, thus serving for transmitting the movement of the cylinder 5 to the outer friction pad unit 2a. A hollow piston member 7 is slidably mounted in a bore 5b of said cylinder 5, with closed end 7a of said piston member protruding a small distance from the open inner end of the cylinder 5 and being kept in contact with the back-up plate 2d of the inner friction pad unit 2b for transmitting its outward movement thereto. The opposite or inner open end 7b opens at 7c towards a closed bottom 5a of the cylinder 5.

A hollow cylindrical member 8 is housed in the interior space of the cylinder 5, with inner end 8a of said member 8 slidably projecting through the inner open end 7c into the interior space of said hollow piston 7. The cylindrical member 8 is formed at its outer end 8b integrally with a ring flange 8c having an outer diameter slightly less than the bore diameter of the cylinder 5. The member 8 is further formed with an axially extending passage 8'.

In the embodiment shown in FIGS. 1 and 2, the cylindrical member 8 has a single and large axial passage 8', thus providing the convenience of a light weight feature.

In the modified design of the cylindrical member shown generally at 80 in FIG. 3, the member is a solid one in place of the foregoing hollow member, so as to provide for greater rigidity and strength. In the present modification of the rigid cylinder member 80, the latter is formed with a plurality of axial and elongate perforations 8' similar to a cross section of a lotus root, the purpose of which will be described hereinafter.

Between the relatively sliding surfaces of cylinder 5 and piston 7, between piston 7 and sleeve 8 and between cylinder 5 and flange portion 8c of sleeve 8, there are provided resilient sealing means 9, 10 and 11, respectively. In the cylinder 5, a ring-shaped hydraulic chamber "M" is formed, with the chamber being defined by a part of the bore wall surface 5b, ring-shaped end surface 7d of the open inner end of piston 7, a part of the outer cylinderical surface of sleeve 8 and the flange portion 8c thereof.

Within the cylinder, there is provided a second hydraulic chamber "N" which is defined by the inner end wall surface or bottom 5a of cylinder 5, the inner wall surface of sleeve 8, and the closed end wall 7a of the hollow piston 7.

Numeral 12 generally represents a pressure liquid supply source means, preferably a conventional master cylinder unit which may preferably be of the tandem type, with said supply source means, or more specifically two supply sections thereof, not shown, being independently connected hydraulically to these two chambers "M" and "N" through respective piping means 15 and 13 schematically shown by respective chain-dotted lines, so as to provide two independent hydraulic systems relative to the piston-cylinder unit under consideration. Respective ports 16 and 14 bored laterally and axially through the wall of the cylinder 5 complete such two independent hydraulic systems.

In close proximity to the inner end wall surface 5a, and in the inside cylinderical wall surface 5b of the cylinder 5, a ring groove 17 is formed for receiving a snap spring ring 18. The flange portion 8c of sleeve or the cylindrical member 8 is held in position relative to the cylinder bottom 5a by the cooperation with said snap ring 18 and corner sealing means 11. Flange portion 8c is kept in indirect pressure contact with said cylinder bottom 5a. For assuring this resilient, yet pressurized positioning of sleeve 8 relative to the cylinder bottom, a resilient ring (wave washer) 100 is provided between snap ring 18 and flange portion 8c.

As seen, the flange portion 8c is rounded, chamfered or tapered at its diametrally and axially outer corner where the flange is kept in resilient pressure engagement with the corner ring type sealing means 11 so that the sleeve 8 is allowed to perform a slight radial or lateral movement at the very point of the flange portion. In addition, the sleeve can perform a slight axial movement. By either or both of these movements of the sleeve 8, the corner sealing means 11 is correspondingly and resiliently flexed or deformed. As a result, the sleeve 8 can perform a slight angular movement to its central axis. For allowing these movements, the inside end corner 5c is rounded.

In FIG. 2, the chamfered corner edge of said flange portion 8c is shown clearly at 8f.

With the cylindrical member or sleeve 8 positioned within and relative to the cylinder 5 as shown in FIG. 1, the sealing ring means 11 is squeezed under pressure between the chamfered bottom corner 5c of the cylinder, on the one hand, and the tapered ring edge 8f of the flange portion 8c, on the other.

Means for resilient and relative positioning and mounting of the flange sleeve or cylindrical member 8 in the hydraulic cylinder 5 may be modified from that shown in FIG. 1 into either of those shown in FIGS. 4 and 5, respectively.

More specifically referring to FIG. 4, sealing means 11a formed again into a ring is inserted into a ring groove 19 concentrically formed on the outer end surface 8g of sleeve 8 and in proximity to the chamfered peripheral corner edge 8f thereof. The sealing ring 11a projects partially and axially from the mating reception ring groove 19 so as to establish effectively a sufficient seal between the end surface 8g and the inside bottom wall surface 5a of the cylinder 5 opposite thereto. Parts 17, 18 and 100 are same as before in their design and arrangement. It will be seen, therefore, the cylindrical member or sleeve 8 is kept in resilient and axial pressure engagement with cylinder bottom 5a, yet keep-in a small gap space therebetween.

In the modification shown in FIG. 5, sealing means 11b is formed again into a sealing ring which is formed, however, with a flange portion adapted for being mounted on the outer end of the bore wall of the cylindrical member 8. Therefore, in the present embodiment, the ring groove 19 shown in FIG. 4 has been eliminated. The main part of the sealing means 11 is squeezed between the bottom wall surface 5a and the outer end of the cylindrical member 8. Members denoted 17, 18 and 100 are designed and arranged as before. In this case, the cylindrical member 8 is positioned so as to perform axial and pivotal movements relative to the hydraulic cylinder 5, as was referred to hereinbefore in connection with FIG. 1, the dual hydraulic brake system so far shown and described operates as follows:

When an operator depresses a brake pedal shown at 101 in FIG. 1, pressurized liquid, preferably oil, is delivered from the master cylinder 12 independently in two different paths through the separate pipings 13 and 15 and ports 14 and 16 to the hydraulic chambers "N" and "M," respectively.

Thus, liquid pressure in the chamber "N" acts upon the closed end 7a of hollow piston 7 from the inside thereof.

In a similar way, liquid pressure prevailing in the chamber "M" acts upon the open end 7d of piston 7. Therefore, the piston 7 is moved hydraulically in the right-hand direction, so as to press the left-hand friction unit 2b;2d upon the left-hand side surface of the rotating brake disc 1.

On the other hand, a hydraulic reaction will act upon the cylinder 5 which is movably mounted on the chassis of the automotive vehicle, although not shown by virtue of its very popularity. Thus said cylinder is moved hydraulically in the left-hand direction in FIG. 1. Motion is, therefore, transmitted from the cylinder 5 through its extension arm 6 to the right-hand friction unit 2a;2c which is thus pressed against the right-hand side surface of the rotating brake disc 1. Therefore, this disc 1 is subjected to braking action.

When the operator releases foot pressure from foot pedal 101, the supply of hydraulic pressure liquid is arrested to the chambers "M" and "N," terminating the braking operation. All the related parts are returned to the shown position by virtue of the mechanical force transmitted from the rotating disc 1, because the latter is arranged slightly off set on account of unavoidable fabrication errors and there is always a certain vibration of the vehicle chassis. Obviously, spring return means may be provided, if necessary, although not shown.

If, however, a pipe rupture or the like cause should happen to take place in one hydraulic system component, liquid pressure will lost in either hydraulic chamber "M" or "N." In the present embodiment, the other and remaining system component will remain so that the braking action cannot be disturbed thereby.

The operation of the dual hydraulic brake system is as described, as its principle is already known. It should be stressed that difficulties arise rather from the manufacturing fields. More specifically, conventional corresponding parts to cylindrical member or sleeve 8 and cylinder 5 are made integral with each other and thus, no relative movement is allowed to perform.

Therefore, in order to introduce the piston as at 7 into the ring space formed by and between the inner peripheral surface 5b of cylinder 5 and the outer peripheral surface of sleeve 8 without inviting mechanical clogging or other troubles, the related parts must be fabricated with high precision. As may be easily supposed by and person skilled in the art, it is extremely difficult to fabricate the cylinder 5, piston 7 and sleeve 8 so precisely as to maintain the relative concentricity and precisely slidable relationship with high precision. However, by obeying the structural and operational novel teaching so as to allow the sleeve to perform various mutual movements as referred to above, relative to the cylinder 5, the aforementioned difficulties may be obviated.

In the conventional dual hydraulic system, the constituent parts of the wheel brake cylinder unit are rather numerous and represent complicated configurations. Since those parts are generally metallic, when they are assembled together into a wheel brake unit, the latter may have a rather heavy weight. In contrast to the conventional design, the embodiment of the invention so far shown and described represents such a design that the cylindrical member or sleeve is made as a separate and independent part from the hydraulic cylinder, so as to allow the former to execute lateral and pivotal movement relative to the latter so that otherwise required fabrication preciseness may be lessened to a considerable degree.

The embodiments of the invention in which an exclusive property or privilege is claimed are as follows:

1. A hydraulic wheel brake unit adapted for receiving, in dual manner, pressure liquid from a hydraulic pressure-generating and supply source of a powered and wheeled vehicle, for pressurizing friction means defined by first and second components against a brake disc rotatable in unison with a wheel of said vehicle for performing vehicle braking operation, said unit comprising a cylinder movably mounted on the vehicle and having an open end towards said disc and an opposite closed end, an extension rigid with said cylinder and straddling said disc, a hollow piston having a closed end and an opposite open end, said piston being slidably mounted in said cylinder with said closed end adapted for engagement with said first component of said friction means and its opposite open end facing the closed end of said cylinder, a cylindrical member having inner and outer ends, said cylindrical member being contained in said cylinder and arranged in telescopic relation with said piston, a radial flange at the outer end of said cylindrical member, the diametral dimension of the flange being smaller than the diameter of the bore of the cylinder for providing a permanent radial ring space between the inside wall surface of the cylinder and the outer periphery of the flange, a sealing spacer ring provided between the closed end of the cylinder and the outer end of the cylindrical member providing a permanent disc-like liquid space therebetween, a snap ring mounted on the inside wall surface of the cylinder in proximity to the flange on the cylindrical member providing a permanent axial idle space between the flange and the snap ring, a spring washer positioned in the axial idle space between the flange and the snap ring, said extension of said cylinder being adapted for engagement with the second component of said friction means, a first hydraulic pressure chamber formed into a ring space defined by at least the inside wall surface of the cylinder, the open end of the piston, the outer peripheral surface of the cylindrical member and the sealing spacer ring, and a second hydraulic pressure chamber defined by said disc-like space, the hollow space of the cylindrical member and a second disc-like and variable space provided by the closed inside wall surface of the piston and the inner end of the cylindrical member.

2. The hydraulic wheel brake unit as claimed in claim 1 in which a first port is bored radially through the wall of said cylinder for liquid supply and discharge to and from the first hydraulic pressure chamber.

3. The hydraulic wheel brake unit as claimed in claim 1 in which a port is bored centrally and axially through the closed end of the cylinder for liquid supply and discharge to and from said second hydraulic pressure chamber.

* * * * *